United States Patent
Blank (10) Patent No.: US 12,246,778 B2
(45) Date of Patent: Mar. 11, 2025

(54) RETROFIT TAILGATE LATCHING MECHANISM AND METHOD

(71) Applicant: Mark C. Blank, Menasha, WI (US)

(72) Inventor: Mark C. Blank, Menasha, WI (US)

( * ) Notice: Subject to any disclaimer, the term of this patent is extended or adjusted under 35 U.S.C. 154(b) by 287 days.

(21) Appl. No.: 17/857,283

(22) Filed: Jul. 5, 2022

(65) Prior Publication Data
US 2023/0008925 A1   Jan. 12, 2023

Related U.S. Application Data (60) Provisional application No. 63/218,780, filed on Jul. 6, 2021.

(51) Int. Cl.
*B62D 33/037* (2006.01)
*E05B 83/16* (2014.01)
*E05C 3/14* (2006.01)

(52) U.S. Cl.
CPC ............ *B62D 33/037* (2013.01); *E05B 83/16* (2013.01); *E05C 3/14* (2013.01)

(58) Field of Classification Search
CPC ... B62D 33/037; B62D 33/0273; E05B 83/16; E05B 79/20; E05B 83/18; E05B 85/18; E05C 3/14
See application file for complete search history.

(56) References Cited

U.S. PATENT DOCUMENTS

| | | | |
|---|---|---|---|
| 4,358,150 A | 11/1982 | Nash | |
| 5,451,089 A | 9/1995 | Bender | |
| 5,556,152 A * | 9/1996 | Dunlap | B62D 33/0273 296/180.1 |
| 6,431,630 B1 * | 8/2002 | Meinke | B62D 33/0273 296/57.1 |
| 6,616,207 B2 * | 9/2003 | Mizuta | B62D 33/037 296/57.1 |

(Continued)

FOREIGN PATENT DOCUMENTS

EP    3381772 A1    10/2018

OTHER PUBLICATIONS

Holly Performance Products, Inc., "How To Install Hidden Tailgate Latches—Classic Chevy Truck", retrieved from the internet on or before May 11, 2021 at https://www.holley.com/blog/post/how_to_install_hidden_tailgate_latches_classic_chevy_truck/, 15 pages filed herewith.

*Primary Examiner* — Paul N Dickson
*Assistant Examiner* — Sara Laghlam
(74) *Attorney, Agent, or Firm* — Amundsen Davis, LLC (57) ABSTRACT

A retrofit tailgate latching mechanism and method for a tailgate. This includes a retrofit housing configured to be connected to the tailgate. Also, there is an actuating handle joined with the retrofit housing. A linkage assembly is joined with the actuating handle at a proximal end of the linkage assembly and extending through and within the tailgate toward the stop catch of the truck bed sidewall. The linkage assembly selectively engages and disengages the stop catch of the truck bed sidewall at a distal end of the linkage assembly. A cable is connected between the proximal end and the distal end of the linkage assembly wherein actuation of the actuating handle to an open position pulls the distal end of the linkage assembly toward the actuating handle and disengages the linkage assembly distal end from the stop catch whereby the tailgate can pivot to a lowered position.

15 Claims, 8 Drawing Sheets

(56) References Cited

U.S. PATENT DOCUMENTS

| | | |
|---|---|---|
| 6,669,243 B2 | 12/2003 | Katoh et al. |
| 7,052,071 B2 | 5/2006 | Mulder et al. |
| 8,532,873 B1 | 9/2013 | Bambenek et al. |
| 8,944,484 B2 * | 2/2015 | Kibler .................. B60P 1/26 |
| | | 296/50 |
| 9,656,697 B2 * | 5/2017 | Puscas ................ B62D 33/037 |
| 2011/0057469 A1 * | 3/2011 | Zielinsky ............... B60P 1/267 |
| | | 296/57.1 |
| 2021/0086843 A1 * | 3/2021 | Ishii .................... B62D 33/037 |

* cited by examiner

RETROFIT TAILGATE LATCHING MECHANISM AND METHOD

CROSS-REFERENCE TO RELATED APPLICATION

This application claims the benefit of U.S. Provisional Application No. 63/218,780, filed Jul. 6, 2021, and titled: RETROFIT TAILGATE LATCHING MECHANISM.

TECHNICAL FIELD

This invention generally relates to devices for tailgates, and more particularly to a retrofit tailgate latching mechanism, and method therefor, added to older style vehicle tailgates to replace the traditional ways to hold the tailgate in its vertical position and make it easier to open and close the tailgate than ever before possible.

BACKGROUND

My invention is particularly suited for vehicle truck tailgates that do not have a handle actuated latching mechanism to hold the tailgate in its vertical position when desired to have the tailgate shut at the vehicle back end hauling area. Rather, such existing tailgates are held in place in the upright, shut position by use of an exterior mounted slotted tab on the tailgate that slides over an exterior slotted tab on the truck bed sidewall back surface, known as a "stake". Then a hook-like pin is inserted into the slot of the stake to prevent the tailgate tab from leaving the stake and thereby holding the tailgate upright and secured shut relative to the truck bed sidewall. Such a means is cumbersome, tends to rattle and looks sloppy. Thus, there is a need to address one or more of the deficiencies in the art to better aid in achieving the desirable requirements and avoiding negative ones, for a tailgate mechanism. This is especially so when used to retrofit an older tailgate, and preferably in a way that is more consistent and reliable for such a mechanism and method.

SUMMARY

To address one or more deficiencies in the art and/or better achieve the desirable requirements for opening and closing the tailgate of a truck bed, there is provided a retrofit tailgate latching mechanism for a tailgate with a top portion and with a bottom portion pivotally joined with a truck bed sidewall. The truck bed sidewall has a stop catch near the top portion of the tailgate. The retrofit tailgate latching mechanism includes a retrofit housing configured to be connected to the top portion of the tailgate. The mechanism also includes an actuating handle joined with the retrofit housing. Further, there is a linkage assembly joined with the actuating handle at a proximal end of the linkage assembly and extending through and within the tailgate toward the stop catch of the truck bed sidewall. The linkage assembly selectively engages and disengages the stop catch of the truck bed sidewall at a distal end of the linkage assembly. Finally, there is includes a cable connected between the proximal end and the distal end of the linkage assembly wherein actuation of the actuating handle to an open position pulls the distal end of the linkage assembly toward the actuating handle and disengages the linkage assembly distal end from the stop catch whereby the tailgate can pivot to a lowered position.

In other aspects, there is disclosed a method for retrofitting a tailgate latching mechanism to a tailgate with a top portion and with a bottom portion pivotally joinable with a truck bed sidewall. The truck bed sidewall has a stop catch near the top portion of the tailgate. The method includes the step cutting an opening in the top portion of the tailgate. Another step is installing a retrofit housing configured to be connected to the top portion of the tailgate into the opening. A step is also joining an actuating handle with the retrofit housing. And another step is joining a linkage assembly with the actuating handle at a proximal end of the linkage assembly and extending the linkage assembly through and within the tailgate toward the stop catch of the truck bed sidewall. A further step is configuring the linkage assembly to be able to selectively engage and disengage the stop catch of the truck bed sidewall at a distal end of the linkage assembly. And yet another step is connecting a cable between the proximal end and the distal end of the linkage assembly wherein actuation of the actuating handle to an open position pulls the distal end of the linkage assembly toward the actuating handle and disengages the linkage assembly distal end from the stop catch whereby the tailgate can pivot to a lowered position.

Other aspects of the disclosure are configurations and features for the mechanism directed to opening and closing the handle, the function and components of the linkage assembly, and further particulars of some of those components.

As used herein, the term "join" and formatives thereof means next to or secured with the stated structure or object and there may be intervening material between the referenced structures or objects as long as it does not significantly negate the stated relationship of the referenced structures or objects.

As used herein, the term "secure" and formatives thereof as applied to the materials or components of the present invention is defined as affixing of the subject material or component with another material or component in the stated manner and/or for the period of time.

BRIEF DESCRIPTION OF THE DRAWINGS

The invention may be more completely understood in consideration of the following detailed description of various features of the invention in connection with the accompanying drawings, in which:

FIG. 10 is a perspective view of a tailgate pivotally joined with a truck bed sidewall and the tailgate in an upright position, the tailgate being made ready to install my retrofit tailgate latching mechanism in an opening cut for that.

The drawings show some but not all embodiments. The elements depicted in the drawings are illustrative and not necessarily to scale, and the same (or similar) reference numbers denote the same (or similar) features throughout the drawings, though all the same (or similar) features are not always separately numbered to help avoid over numbering and obscuring what the drawings are disclosing.

DETAILED DESCRIPTION

In accordance with the practice of my innovative retrofit tailgate latching mechanism, as seen in the Figures, there is retrofit tailgate latching mechanism 40 for a tailgate 10 with a top portion 12 and with a bottom portion 14 pivotally joined with a truck bed sidewall 30. Such pivotally joined relationship of the bottom portion 14 with the sidewalls 30 is as conventionally done for the tailgate regardless whether the tailgate includes my invention. The truck bed sidewall 30 has a stop catch near the top portion 12 of the tailgate. For example, preferably, the stop catch can be a post 32 protruding away from the truck bed sidewall 30 and configured to engage with distal end 74 of a linkage assembly and thereby hold the tailgate 10 in an upright position 22. Alternately, the stop catch could be a pin and hole relationship, where the distal end of the linkage assembly is the pin and it inserts into a hole (not shown, but where post 32 is located) sized to receive the distal end of the linkage assembly that is pin-like and extends far enough out to engage with the hole (not seen) and thereby hold the tailgate 10 in upright position 22.

Figure 7:
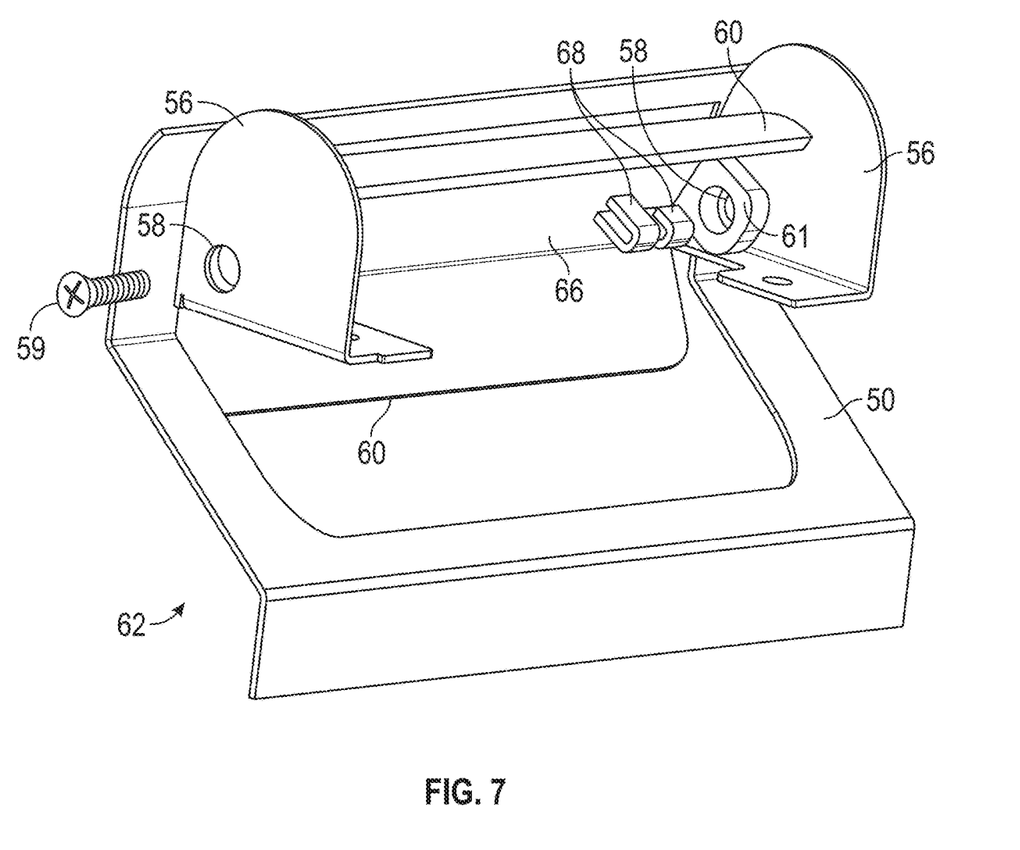
FIG. 7 is a backside perspective view of an actuating handle in the open position and without a linkage assembly joined therewith and depicting the cable mounting tabs where the proximal end of the cable can be joined thereto.
Figure 8:
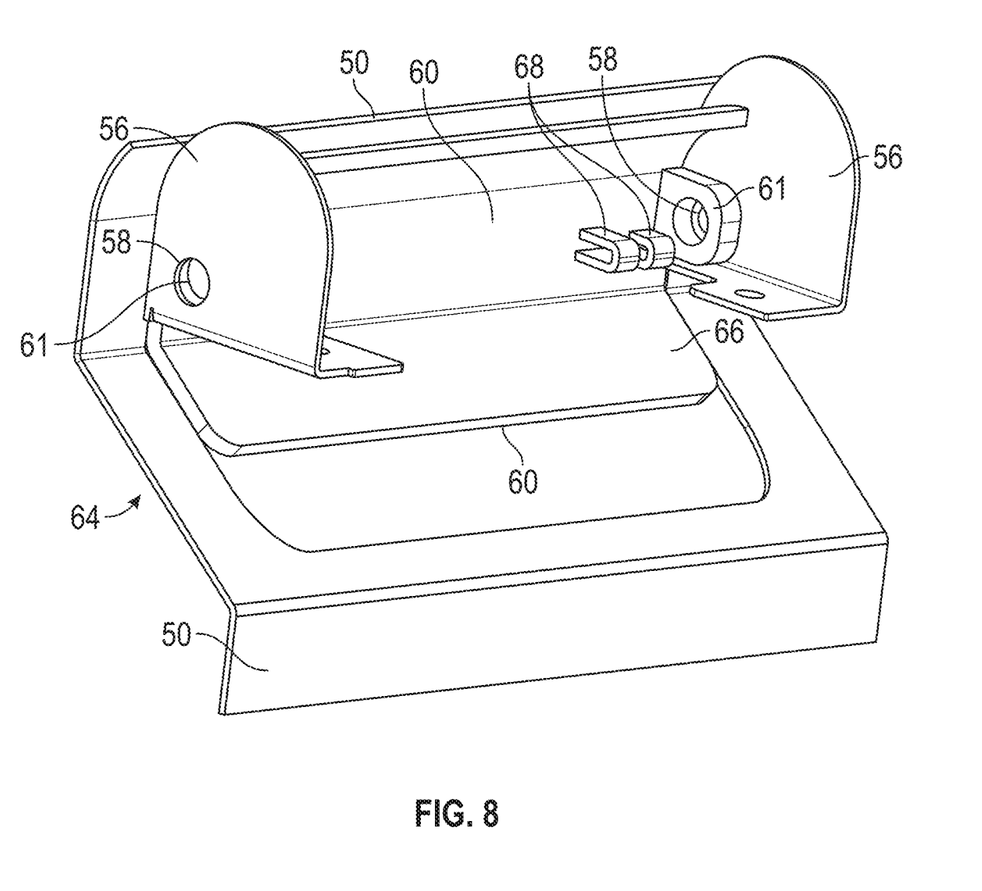
FIG. 8 is a backside perspective view of the actuating handle in FIG. 7, but now in the closed position.
Figure 9:
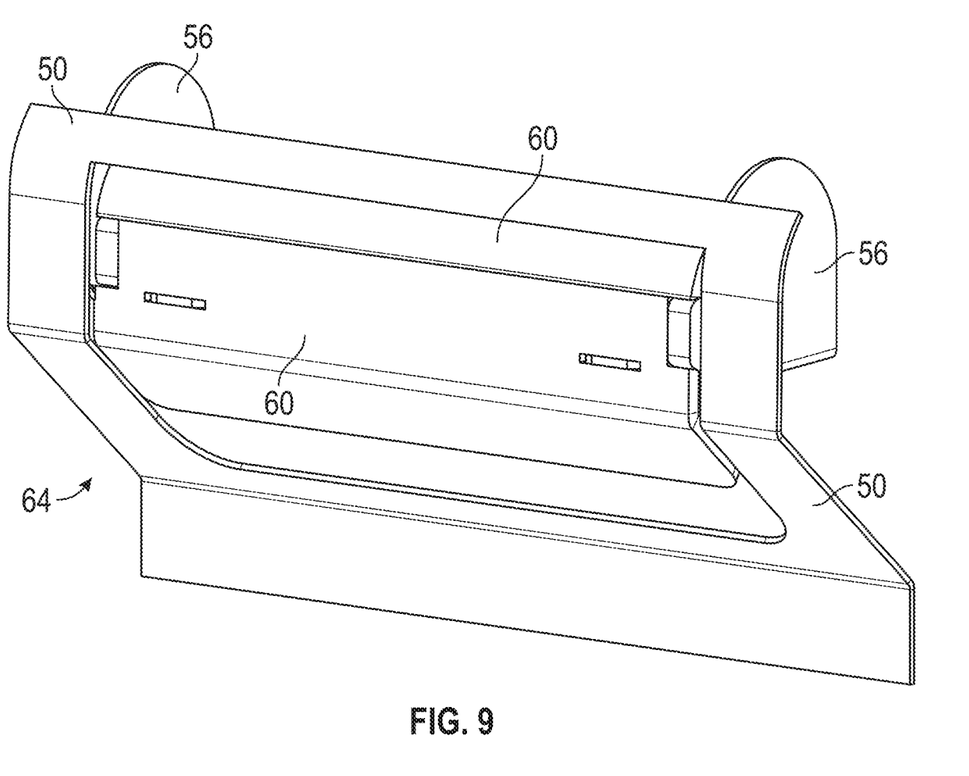
FIG. 9 is a frontside perspective view of the actuating handle in FIG. 8.
Figure 10:
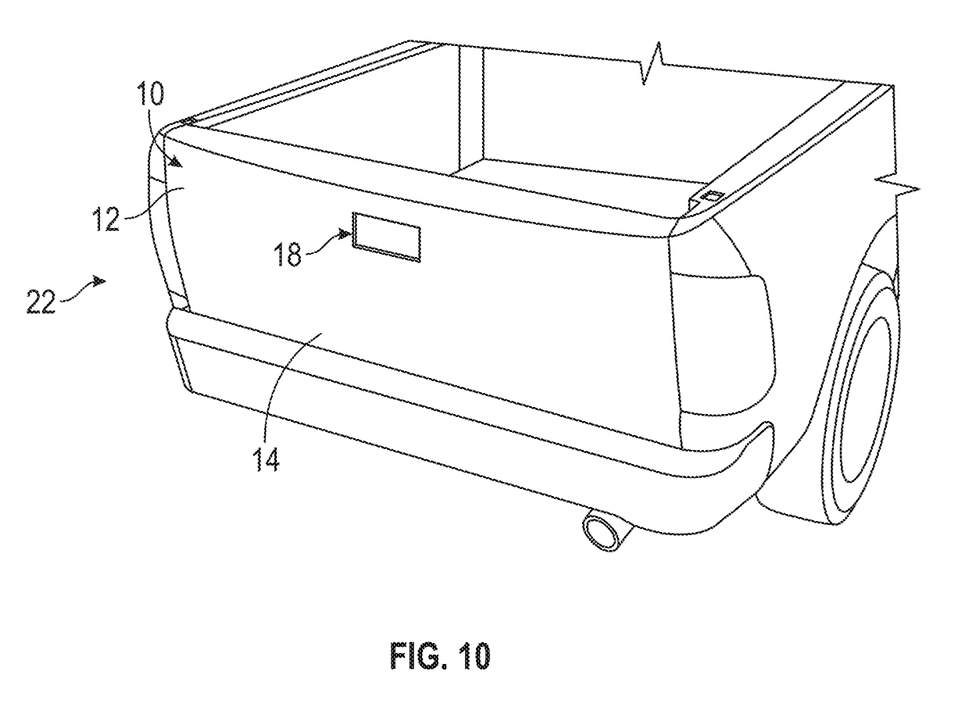

A retrofit housing 50 is configured to be connected to the top portion 12 of the tailgate. For example, an opening 18 can be cut in the top portion of the tailgate, and then the housing 50 secured to the opening by welding or the like, and preferably in a way so when fully secured with the tailgate opening 18 the housing blends into the tailgate as observed by one of ordinary skill in the art and appears like an original outer surface of the tailgate. An actuating handle 60 is joined with the retrofit housing, preferably on a backside of the housing 50. For example, as seen easiest in FIGS. 7 and 8, half circle ends 56 with screw holes 58 are secured to the backside of the housing 50 and/or with the tailgate. Then, the actuating handle has screw mounts 61 on either inside end, and these mounts 61 are pivotally joined via screw holes 58, e.g., with separate screws 59 (only one shown, and each with a nut (not shown) at the other end), joined through the paired holes such that handle 60 can actuate between open position 62 (FIG. 7) and closed position 64 (FIG. 8). Alternately, screws 59 (only one shown) could be flipped (not specifically shown) such that the screw head is in between half circle ends 56 and the joining nut on the end of the screw is outside of the half circle ends 56. Additionally, a mechanical structure other than a screw can be used to create the pivotally joined relationship between the actuating handle 60 and the retrofit housing 50 as would be available in the art and understood in combination with the teaching herein.

Figure 1:
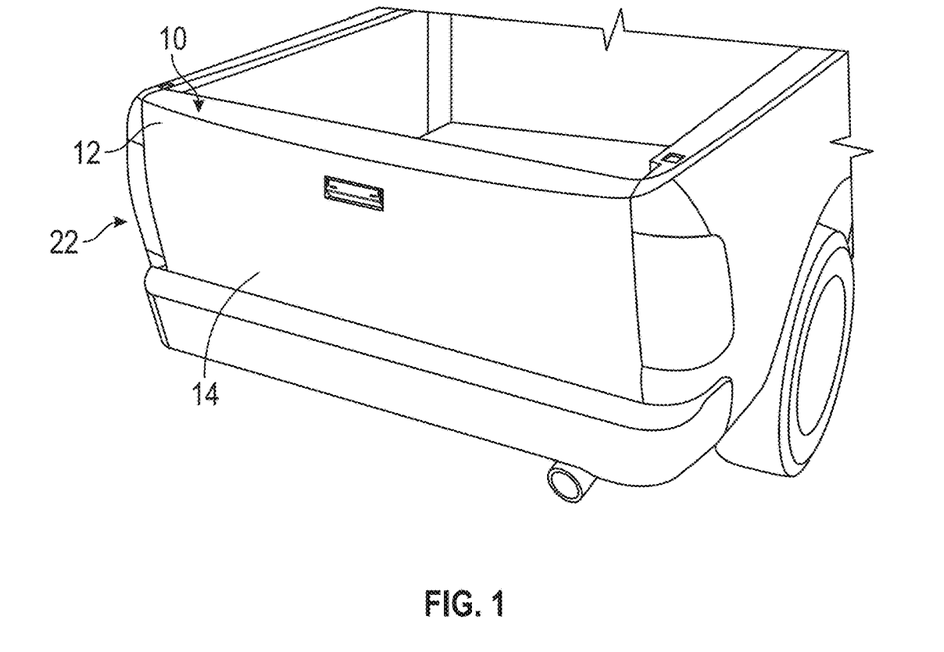
FIG. 1 is a perspective view of my retrofit tailgate latching mechanism for a tailgate pivotally joined with a truck bed sidewall and the tailgate in an upright position.
Figure 2:
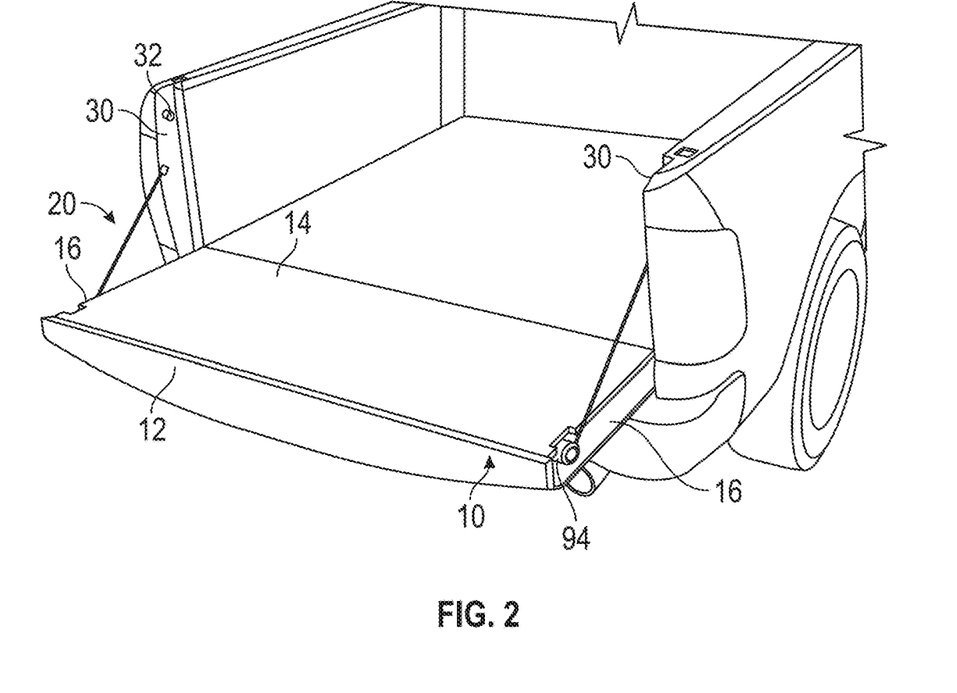
FIG. 2 is a perspective view of that in FIG. 1, with the tailgate in a lowered position.
Figure 3:
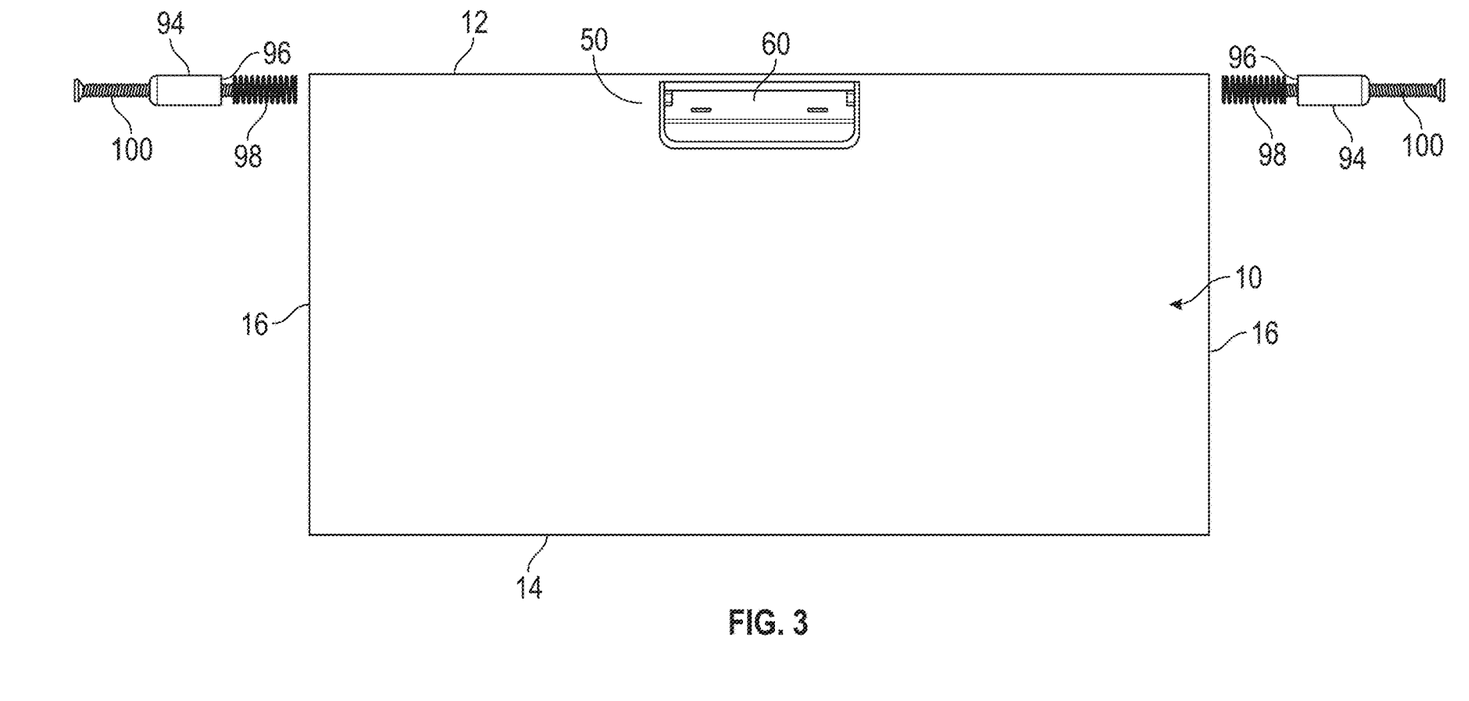
FIG. 3 is an enlarged front view of the tailgate in FIG. 1, showing an assembly view of a portion of the linkage assembly about to be housed within the top portion of the tailgate.
Figure 4:
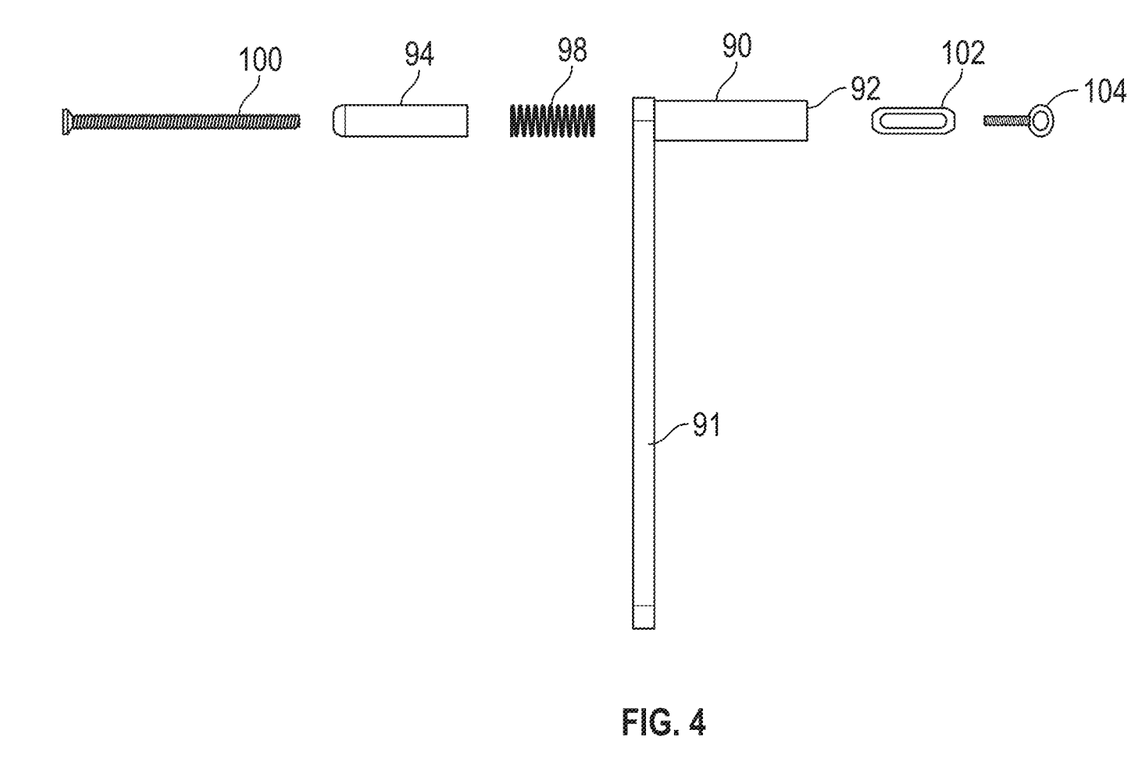
FIG. 4 is an assembly view of a distal portion of the left linkage assembly, and where the right linkage assembly is a mirror image thereof.
Figure 5:
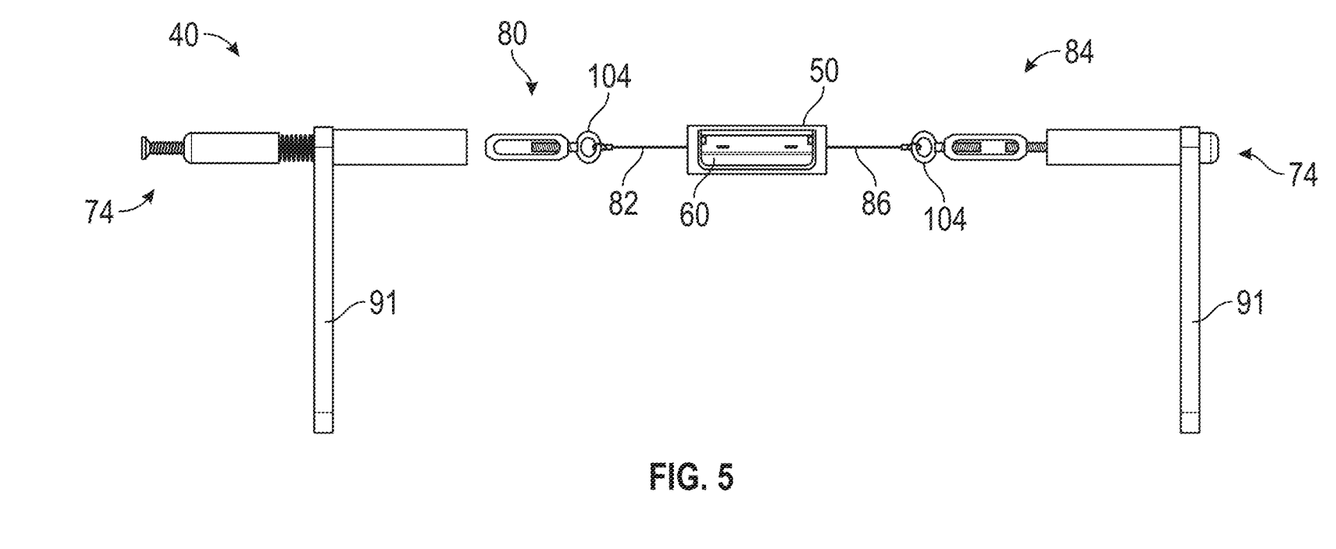
FIG. 5 is a partial assembly view of a left linkage assembly and an assembled view of a right linkage assembly.
Figure 6:
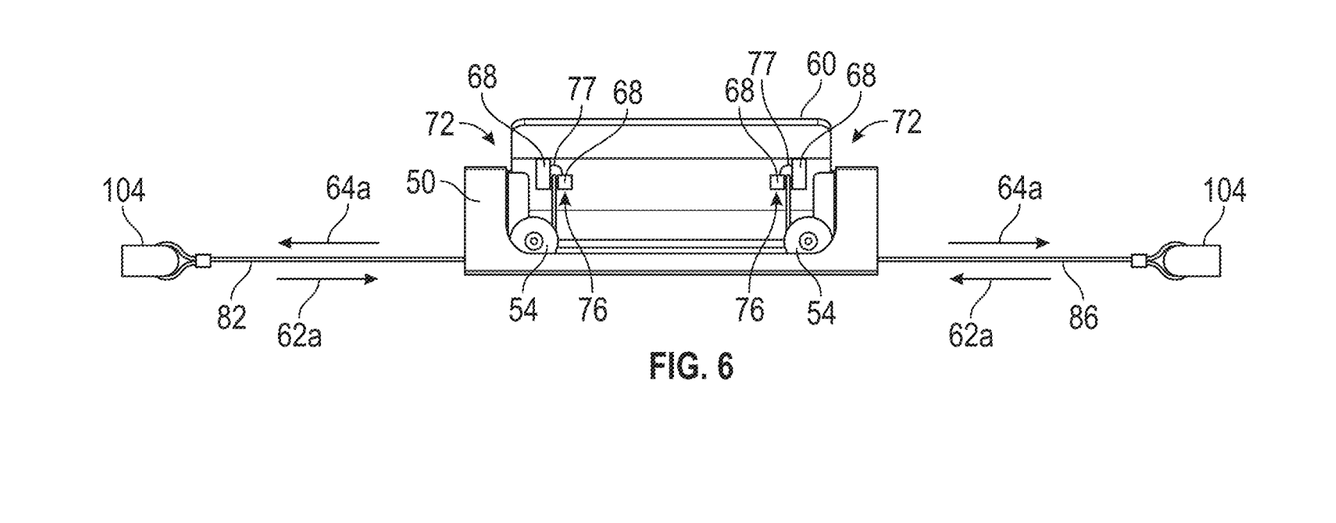
FIG. 6 is a bottom view of an actuating handle joined with a retrofit housing and the handle in an open position that pulls the distal end of the linkage assembly toward the actuating handle.

A linkage assembly, e.g., assemblies 80, 84 as described further herein, is joined with the actuating handle 60 at a proximal end 72 of the linkage assembly and extends through and within the tailgate 10 toward the stop catch of the truck bed sidewall 30. The linkage assembly can be operated by the tailgate user to selectively engage and disengage the stop catch of the truck bed sidewall at distal end 74 of the linkage assembly. A cable is connected between the proximal end 72 and the distal end 74 of the linkage assembly, and actuation of the actuating handle to the open position 62 pulls the distal end 74 of the linkage assembly toward the actuating handle 60 in direction 62a (FIG. 6) and disengages the linkage assembly distal end 74 from the stop catch, and then the tailgate can pivot to lowered position 20 (as in FIG. 2). Additionally, as desired, actuation of the actuating handle 60 to closed position 64 returns the distal end 74 of the linkage assembly further away from the actuating handle 60 in direction 64a and enables the linkage assembly distal end to engage the stop catch when the tailgate is in upright position 22 (as well as any time the handle is in the closed position, regardless position of the tailgate).

While only one linkage assembly is needed to practice my innovative mechanism 40, preferably the linkage assembly can be a left linkage assembly 80 including a left cable 82 and a right linkage assembly 84 including a right cable 86, and more preferably, each of these operate essentially the same as mirror opposites of each other. That is, in this way cables 82, 84 each move in direction 62a, respectively, toward the center of the handle when the handle is moved into the open position, and cables 82, 84 each move in direction 64a, respectively, away from the center of the handle when the handle is moved into the closed position. Cables 82, 84 are interposed in the linkage assembly and make up less that the complete length from proximal end to distal end, as the linkage assembly extends from the outer tip of proximal end 72 to the outer tip of distal end 74 that ends with the striker slider 94. As desired, a portion of the length of the cable(s) can be more rigid, like a rod or be a rod, as long as at least a portion of the cable(s) is able to slidingly engage a corner turn, which can be movable or stationary relative to the retrofit housing, and for example is a rotatable pulley wheel 54.

The mechanism 40 may also include, preferably, cable mounting tabs 68 secured to backside 66 of the actuating handle 60. A proximal end 76 of the cable can be joined with the cable mounting tabs 68. For example, a bulbous or cylindrical cable end latch 77 can be secured to the end of the cable and then the latch 77 configured to be releasably secured with cable mounting tabs 68 (e.g., FIG. 6). Additionally, or alternately, the linkage assembly can include the corner turn joined with the retrofit housing 50, and the cable slidingly engages the corner turn when the handle actuates between the open position 62 and the closed position 64. For example, preferably the corner turn is rotatable pulley wheel 54. The corner turn can be any structure that serves to change direction of the cable that is acted upon by the actuating handle when handle 60 actuates between the open position 62 and the closed position 64, and consequently the distal end 74 of the linkage assembly moves toward handle 60 when handle 60 is moved into open position 62, and distal end 74 moves away from handle 60 when handle 60 is moved into closed position 64, where "moves away" is as compared to the location of the distal end when the handle is in the open position.

Additionally, or separately, another aspect of the mechanism 40 relates to distal end 74. That is, for example, the linkage assembly distal end 74 can include a slider housing 90 secured to an end 16 of the tailgate, with a striker slider 94 slidingly housed within the slider housing 90 such that slider 94 selectively engages and disengages the stop catch of the truck bed sidewall whereby the tailgate can pivot between the lowered position 20 and the upright position 22. For example, the housing 90 can be secured directly to the tailgate, like in a threaded relationship therewith. Alternately, a tailgate mounting arm 91 can be used and the mounting arm secured to the tailgate, for example at end 16, and the housing 90 then joined with the arm 91. Additionally, preferably, a spring 98 can be disposed within the slider housing 90 and located between an interior end 92 of the slider housing and an end 96 of the striker slider, to create a constant outward expanding force whenever the spring is compressed, and thereby cause the striker slider to selectively engage and disengage the stop catch of the truck bed sidewall whereby the tailgate can pivot between the lowered position and the upright position. Further, in this way, the spring located on the outside of the end 16 of the tailgate in the slider housing as taught can be constantly urging the striker slider 94 away from the end 16 of the tailgate and toward the stop catch of the truck bed sidewall 30 whenever the spring is compressed from a non-compressed format. That is, when a spring is included, preferably the spring is constantly under compression to help keep tension throughout the linkage assembly. Further, preferably, such spring has a compression range coordinated with the open and closed positions of the handle, which are coordinated with the selective engagement and disengagement of the distal end 74 with stop catch. Thus, preferably, the spring is under a range of compression from some compression to completely compressed, and only completely compressed (and preferably not completely compressed) when the handle is in the open position as operated by the user of the tailgate pulling on the handle to assist in moving the tailgate from the open upright position to the lowered position. The same can happen in reverse, though preferably the distal end 74 and stop catch are configured so the user can slam shut the tailgate and enable the tailgate to remain in the upright position through engagement of distal end 74, e.g., striker slider 94, and the stop catch, e.g., post 32.

Yet additionally or alternately, preferably the linkage assembly further includes an adjustable turnbuckle 102 joined with and between the striker slider 94 and the cable, such as cables 82, 86. For example, in this way, preferably, the adjustable turnbuckle 102 can be configured to enable a predetermined distance between the striker slider and the cable. And, this distance can be adjusted to essentially lengthen or shorten the total length of the linkage assembly between proximal and distal ends 72, 74, to find the optimal length for efficiently and effectively causing the linkage assembly to selectively engage and disengage the stop catch of the truck bed sidewall at a distal end of the linkage assembly when the handle 60 actuates between the open and closed positions 62, 64. The cable can be joined with turnbuckle 102 via eyelet 104, or other conventional mechanical structure to join the two components together in combination with the teaching here. A striker bolt 100 can be used to pass through the slider 94, spring 98 and then into and sufficiently though the slider housing 90 to join with turnbuckle 102, for example in a threaded relationship. Bolt 100 can be screwed more or less into turnbuckle 102 as needed to get a desired overall length to the linkage assembly for optimal operation of mechanism 40 as taught herein.

In other aspects, attention is directed to features related to a method for retrofitting tailgate latching mechanism 40 to tailgate 10 with top portion 12 and with bottom portion 14 pivotally joinable with truck bed sidewall 30. The truck bed sidewall has a stop catch near the top portion 12 of the tailgate. The method includes these steps (in any order unless specifically stated as a required order, or when one step must logically precede another step before the later step can reasonably be completed). There is cutting opening 18 in the top portion 12 of the tailgate 10. Another step is installing retrofit housing 50 configured to be connected to the top portion of the tailgate and into the opening. Next is joining actuating handle 60 with the retrofit housing 50, for example, in the way describe previously.

Then, there is joining the linkage assembly with the actuating handle at a proximal end of the linkage assembly and extending the linkage assembly through and within the tailgate toward the stop catch of the truck bed sidewall. For example, preferably, this step of joining the linkage assembly with the actuating handle can be joining left linkage assembly 80 including left cable 82 and joining right linkage assembly 84 including right cable 86. Yet another step is configuring the linkage assembly to selectively engage and disengage the stop catch of the truck bed sidewall 30 at distal end 74 of the linkage assembly. For example, and as described herein, this can include one or more of the length of the linkage assembly, the use of the spring, the use of the adjustable turnbuckle, and any other linkage assembly component between proximal and distal ends 72, 74. Still another step is connecting a cable between the proximal end 72 and the distal end 74 of the linkage assembly wherein actuation of the actuating handle to an open position pulls the distal end of the linkage assembly toward the actuating handle and disengages the linkage assembly distal end from the stop catch whereby the tailgate can pivot to lowered position 20.

Considering other features of the method, there is disclosed other, preferred, features related to the actuating handle 60. For example, there can be the step of actuating the actuating handle to the closed position 64 that returns the distal end 74 of the linkage assembly further away from the actuating handle (e.g., versus when the handle is in the open position) and enables the linkage assembly distal end 74 to engage the stop catch when the tailgate is in upright position 22. Additionally or alternately, there can be joining the cable with cable mounting tabs 68 secured to backside 66 of the actuating handle and a proximal end 76 of the cable is joined to tabs 68. Additionally or alternately, there can be the step joining a corner turn with the retrofit housing 50 and the cable slidingly engages the corner turn when the handle 60 actuates between the open position 62 and the closed position 64.

Turning to other features of the method, advantages can be seen and are preferred, for the distal end 74 of the linkage assembly. For example, preferably, there is also the step securing slider housing 90 to end 16 of the tailgate 10, and housing striker slider 94 slidingly within the slider housing 90 such that the striker slider selectively engages and disengages the stop catch of the truck bed sidewall 30 whereby the tailgate 10 can pivot between upright position 22 and lowered position 20. Additionally or alternately, the method can include locating spring 98 within the slider housing 90 between interior end 92 of the slider housing and end 96 of the striker slider to thereby cause the striker slider to selectively engage and disengage the stop catch of the truck bed sidewall whereby the tailgate can pivot between the lowered position 20 and the upright position 22. Additionally or alternately, the method can include adjusting adjustable turnbuckle 102 joined with and between the striker slider 94 and the cable to a predetermined distance between the striker slider and the cable. Additionally or alternatively, the method can include engaging the distal end 74 of the linkage assembly with post 32 protruding away from the truck bed sidewall 30 as the stop catch to thereby hold the tailgate in the upright position, and locked in that position until the actuating handle moves to the open position causing the striker slider to disengage from the stop catch, for example post 32.

Preferred dimensions of the mechanism 40 are: a handle 60 length of about four inches to six inches (can be longer if desired and coordinated with the retrofit housing), a handle height of about one inch to three inches, a retrofit housing length of about six inches to essentially the full length of the tailgate and a retrofit housing height of about one-quarter inch to three inches larger than the height of the handle both above and below the handle, and a linkage assembly length from proximal end to distal end of about twenty-two inches to twenty-eight inches (can be longer if desired based on width of the tailgate). As used here, "length" is in the same dimension as the length of the tailgate and "height" is in the same dimension as the height of the tailgate from its top edge to its bottom edge. Conventional rigid materials (and semi-rigid for the cable) can be used to make my mechanism 40, in conjunction with the teaching herein, for example, steel, aluminum, or other material compositions of sufficient strength as would be discerned by one of ordinary skill in the art in combination with the teachings herein, are preferred. And, the mechanism may be separate parts joined together or a combined molded or formed structure with the various parts and features as described herein.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the applicable retrofit latching mechanism arts, and all such modifications and other embodiments are intended and deemed to be within the scope of the present invention.

What is claimed is:

1. A retrofit tailgate latching mechanism for a tailgate with a top portion and with a bottom portion pivotally joined with a truck bed sidewall, the truck bed sidewall having a stop catch near the top portion of the tailgate, the retrofit tailgate latching mechanism comprising:
   a retrofit housing configured to be and connected to the top portion of the tailgate;
   an actuating handle joined with the retrofit housing;
   a linkage assembly joined with the actuating handle at a proximal end of the linkage assembly and extending through and within the tailgate toward the stop catch of the truck bed sidewall;
   the linkage assembly selectively engages and disengages the stop catch of the truck bed sidewall at a distal end of the linkage assembly;
   wherein the linkage assembly includes a cable connected between the proximal end and the distal end of the linkage assembly and wherein actuation of the actuating handle to an open position moves an entirety of the actuating handle upward and pulls the distal end of the linkage assembly toward the actuating handle and disengages the linkage assembly distal end from the stop catch whereby the tailgate can pivot to a lowered position;
   wherein actuation of the actuating handle to a closed position moves the entirety of the actuating handle downward and returns the distal end of the linkage assembly further away from the actuating handle and enables the linkage assembly distal end to engage the stop catch when the tailgate is in an upright position;
   wherein the linkage assembly comprises a left linkage assembly including a left cable and a right linkage assembly including a right cable;
   wherein the linkage assembly includes a pair of corner turns joined with the retrofit housing and each of the left cable and the right cable slidingly engages one of the pair of corner turns when the handle actuates between the open position and the closed position; and,
   wherein the pair of corner turns are protectively located between the actuating handle and the retrofit housing.

2. The retrofit tailgate latching mechanism of claim 1, wherein cable mounting tabs are secured to a backside of the actuating handle and a proximal end of the cable is joined with the cable mounting tabs.

3. The retrofit tailgate latching mechanism of claim 1, wherein the corner turn is a rotatable pulley wheel.

4. The retrofit tailgate latching mechanism of claim 1, wherein the linkage assembly distal end includes a slider housing secured to an end of the tailgate and a striker slider slidingly housed within the slider housing and that selectively engages and disengages the stop catch of the truck bed sidewall whereby the tailgate can pivot between the lowered position and the upright position.

5. The retrofit tailgate latching mechanism of claim 4, further comprising a spring disposed within the slider housing and located between an interior end of the slider housing and an end of the striker slider to thereby cause the striker slider to selectively engage and disengage the stop catch of the truck bed sidewall whereby the tailgate can pivot between the lowered position and the upright position.

6. The retrofit tailgate latching mechanism of claim 4, wherein the linkage assembly further includes an adjustable turnbuckle joined with and between the striker slider and the cable.

7. The retrofit tailgate latching mechanism of claim 6, wherein the adjustable turnbuckle is configured to enable a predetermined distance between the striker slider and the cable.

8. The retrofit tailgate latching mechanism of claim 1, wherein the stop catch is a post protruding away from the truck bed sidewall and configured to engage with the distal end of the linkage assembly and thereby hold the tailgate in the upright position.

9. The retrofit tailgate latching mechanism of claim 1, wherein the linkage assembly comprises a left linkage assembly including a left cable and a right linkage assembly including a right cable.

10. A method for retrofitting a tailgate latching mechanism to a tailgate with a top portion and with a bottom portion pivotally joinable with a truck bed sidewall, the truck bed sidewall having a stop catch near the top portion of the tailgate, the method comprising:

cutting an opening in the top portion of the tailgate;

installing a retrofit housing configured to be and connected to the top portion of the tailgate into the opening;

joining an actuating handle with the retrofit housing;

joining a linkage assembly with the actuating handle at a proximal end of the linkage assembly and extending the linkage assembly through and within the tailgate toward the stop catch of the truck bed sidewall and further comprising joining a left linkage assembly including a left cable and joining a right linkage assembly including a right cable;

configuring the linkage assembly to be able to selectively engage and disengage the stop catch of the truck bed sidewall at a distal end of the linkage assembly;

connecting a cable between the proximal end and the distal end of the linkage assembly wherein the linkage includes the cable and wherein actuation of the actuating handle to an open position moves an entirety of the actuating handle upward and pulls the distal end of the linkage assembly toward the actuating handle and disengages the linkage assembly distal end from the stop catch whereby the tailgate can pivot to a lowered position;

wherein actuating the actuating handle to a closed position moves the entirety of the actuating handle downward and returns the distal end of the linkage assembly further away from the actuating handle and enables the linkage assembly distal end to engage the stop catch when the tailgate is in an upright position;

joining a pair of corner turns with the retrofit housing and the cable slidingly engages the corner turn when the handle actuates between the open position and the closed position; and, protectively locating the pair of corner turns between the actuating handle and the retrofit housing.

11. The method of claim 10, further comprising joining the cable with cable mounting tabs secured to a backside of the actuating handle and a proximal end of the cable is joined to the mounting tabs.

12. The method of claim 10, further comprising securing a slider housing to an end of the tailgate and housing a striker slider slidingly within the slider housing such that the striker slider selectively engages and disengages the stop catch of the truck bed sidewall whereby the tailgate can pivot between an upright position and the lowered position.

13. The method of claim 12, further comprising locating a spring within the slider housing between an interior end of the slider housing and an end of the striker slider to thereby cause the striker slider to selectively engage and disengage the stop catch of the truck bed sidewall whereby the tailgate can pivot between the lowered position and the upright position.

14. The method of claim 10, further comprising adjusting an adjustable turnbuckle joined with and between the striker slider and the cable to a predetermined distance between the striker slider and the cable.

15. The method of claim 10, further comprising engaging the distal end of the linkage assembly with a post protruding away from the truck bed sidewall as the stop catch to thereby hold the tailgate in an upright position.

* * * * *